US005698512A

United States Patent [19]
Austin et al.

[11] Patent Number: 5,698,512
[45] Date of Patent: *Dec. 16, 1997

[54] WATER SOLUBLE POLYMERS CONTAINING ALLYLOXYBENZENESULFONIC ACID MONOMER

[75] Inventors: Anne-Marie B. Austin, Signal Mountain; Allen M. Carrier, Hixson, both of Tenn.; Michael L. Standish, Rossville, Ga.

[73] Assignee: National Starch and Chemical Investment Holding Corporation, Wilmington, Del.

[*] Notice: The term of this patent shall not extend beyond the expiration date of Pat. No. 5,547,612.

[21] Appl. No.: 665,752

[22] Filed: Jun. 18, 1996

Related U.S. Application Data

[63] Continuation-in-part of Ser. No. 390,731, Feb. 17, 1995, Pat. No. 5,547,612.
[51] Int. Cl.$^6$ .................... C11D 1/94; C11D 1/28; C11D 13/18
[52] U.S. Cl. .................... 510/475; 510/402; 510/476; 510/477; 510/495; 252/363.5; 252/180; 524/3; 526/287; 526/240

[58] Field of Search ................... 526/287, 240; 524/3; 510/402, 475, 476, 477, 495; 252/363.5, 180

[56] References Cited

U.S. PATENT DOCUMENTS

| | | | |
|---|---|---|---|
| 4,451,628 | 5/1984 | Dammann | 526/225 |
| 4,504,643 | 3/1985 | Boutin et al. | 526/287 |
| 4,589,995 | 5/1986 | Fukumoto et al. | 252/180 |
| 4,709,091 | 11/1987 | Fukumoto et al. | 562/595 |
| 4,711,725 | 12/1987 | Amick et al. | 210/701 |
| 4,892,898 | 1/1990 | Leighton et al. | 524/3 |

*Primary Examiner*—Paul Lieberman
*Assistant Examiner*—Nicholas Ogden
*Attorney, Agent, or Firm*—William K. Wissing

[57] ABSTRACT

Water soluble polymers are prepared from an allyloxybenzenesulfonic acid monomer, a methallyl sulfonic acid monomer, a copolymerizable nonionic monomer, and a copolymerizable olefinically unsaturated carboxylic acid monomer. Aqueous compositions containing the water soluble polymers and nonionic surfactants are stable to phase separation of the polymer from the nonionic surfactant.

7 Claims, No Drawings

WATER SOLUBLE POLYMERS CONTAINING ALLYLOXYBENZENESULFONIC ACID MONOMER

This application is a continuation-in-part of application Ser. No. 08/390,731, filed Feb. 17, 1995, now U.S. Pat. No. 5,547,612.

FIELD OF THE INVENTION

This invention relates to novel, multifunctional, water-soluble polymers prepared from an allyloxybenzenesulfonic acid monomer, a methallyl sulfonic acid monomer, a copolymerizable olefinically unsaturated carboxylic acid monomer and a copolymerizable nonionic monomer and to stable aqueous compositions which contain the water-soluble polymer and a nonionic surfactant.

BACKGROUND OF THE INVENTION

There are many aqueous industrial systems which require that various materials remain in a soluble, or suspended, or dispersed state. Typical aqueous systems include, for example, boiler water or steam generating systems, cooling water systems, gas scrubbing systems, pulp and paper mill systems, desalination systems, and downhole systems encountered during the production of gas, oil, and geothermal wells. In many cases, water contains (either naturally or by contamination) ingredients, such as inorganic salts, which can cause accumulation, deposition, and fouling problems. These salts are formed by the reaction of metal cations, such as calcium, magnesium or barium, with inorganic anions such as phosphate, carbonate and sulfate. These salts have low solubilities in water and as their concentration in solution increases, or as the pH or temperature of the water containing them increases, these salts tend to precipitate from solution, crystallize and form hard deposits or scale on surfaces. Scale formation is a problem in heat transfer devices, boilers, secondary oil recovery wells, automatic dish washers and on substrates washed with such hard waters.

Many cooling water systems, including industrial cooling towers and heat exchangers, made from carbon steel experience corrosion problems. Corrosion is combated by the addition of various inhibitors such as orthophosphate compounds and/or zinc compounds. The addition of phosphates, however, adds to the formation of highly insoluble phosphate salts such as calcium phosphate. The addition of zinc compounds can also lead to the precipitation of insoluble salts such as zinc hydroxide, and zinc phosphate. Other inorganic particulates, such as mud, silt and clay, are commonly found in cooling water. These particulates tend to settle onto surfaces and thereby restrict water flow and heat transfer unless they are effectively dispersed.

The stabilization of aqueous systems containing scale forming salts and inorganic particulates involves one or a combination of mechanisms. Dispersion of the precipitated salt crystals is another stabilization mechanism believed to be the result of the adsorption of the inhibitor onto precipitated crystals. The adsorption of the inhibitor can also be used to stabilize the system by facilitating the dispersion and subsequent removal of other suspended particulates, such as mud, silt and clay, and metals such as iron and zinc and their insoluble salts, from aqueous systems. Another stabilization mechanism involves the ability of the inhibitor to interfere with and distort the crystal structure of the scale making the scale less adherent to surfaces or other forming crystals or existing particulates.

Many different synthetic water soluble polymers have been employed in a wide range of water treatment applications as dispersants for particulate matter and inhibitors of mineral scale formation and deposition. Polymers containing carboxylic acid and/or sulfonic acid functionality have been found to be particularly useful.

U.S. Pat. No. 4,892,898 (issued Jan. 9, 1990 to J. Leighton, et al.) discloses water soluble polymers of allyloxybenzenesulfonate monomers and one or more copolymerizable monomers. U.S. Pat. No. 4,709,091 (issued Nov. 24, 1987 to Y. Fukumoto, et al.) discloses polymers of maleic acid and sodium methallyl sulfonate which may be used as a dispersing agent and a scaling inhibitor. U.S. Pat. No. 4,711,725 (issued Dec. 8, 1987 to D. Amick, et al.) discloses processes for stabilizing aqueous systems containing scale forming salts and inorganic particulates by adding to such systems low molecular weight water soluble polymers which contain (meth)acrylic acid units, acrylamido alkyl or aryl sulfonate units and one or more units selected from vinyl esters, vinyl acetate and substituted acrylamides. U.S. Pat. No. 4,504,643 (issued Mar. 12, 1985 to J. Boutin, et al.) discloses a water soluble (meth)acrylic acid/methallylsulfonate copolymer and a scale inhibitor for aqueous environments. U.S. Pat. No. 4,451,628 (issued May 29, 1984 to L. Dammann) discloses low molecular weight water soluble polymers made by copolymerizing methallyl sulfonic acid, or the alkali metal salts thereof, with water soluble monomers, which polymers may be used as dispersants or scale inhibitors. Even though there are numerous water treatment polymers, as indicated above, the water treatment industry is constantly looking for new processes and products which will provide more efficient operation of aqueous systems by maintaining water contaminants in a dispersed, suspended or soluble state under a wide range of process conditions.

Water soluble polymers are also of importance in other systems including, for example, high solid slurries, i.e., 25 to 85 weight percent solids, such as drilling muds, cementiferous compositions, pigment dispersions, mineral slurries and in detergent compositions.

In aqueous drilling muds, a dispersant's ability to deflocculate and disperse flocculated and agglomerated solids, especially in electrolyte-rich fluids, is highly desired. Conventionally used polyacrylates are known to be sensitive to divalent cations which may be introduced into a drilling fluid through electrolyte-releasing formations containing gypsum, lime and other salt deposits or by the water available to formulate the mud (e.g., sea water). There is still a need for new products which can provide rheological stability to polyelectrolyte containing drilling muds, and in particular to high solids muds (having densities greater than 15 pounds per gallon).

In cementiferous compositions, polymeric additives which improve the physical characteristics such as the flow and workability thereof are employed. The additives (often referred to as plasticizers) improve the flow characteristics of the compositions containing them so that they may be pumped or effectively poured to fill all the spaces in a mold or other structure. Such additives can be used to design cementiferous compositions with a reduced water content which still retains adequate flow properties.

In detergent compositions, polymers may impart many useful functions. They can function, either independently or concurrently, as viscosity reducers in the processing of powdered detergents, as antiredeposition agents, as scale and deposit inhibitors, as crystal modifiers, and as detergent assistants which are capable of completely or partially replacing the materials used as builders, while imparting to surfactants optimum properties with respect to detergent actions. Recent trends in the art have been to reduce or eliminate the use of inorganic phosphates due to environmental pollution problems. A variety of other methods of water softening have been employed, of which one of the most economical is the addition of alkali metal carbonate salts. However, these salts are effective by removing hardness ions via precipitation, thereby leaving unacceptable levels of residue on the washed articles. Polymers which exhibit both superior threshold inhibition, i.e., they can maintain the hardness ions in solution past their normal precipitation concentration, and crystal modification, which can prevent the unacceptable levels of residue adhering on the washed articles, are particularly preferred.

Polymers have found wide utility in machine dishwashing applications by performing many of the same functions as in fabric laundering formulations. However, polymers may be required to perform other functions due to differences in the formulations, the substrate being cleaned, and the machine itself. Polymers are added which exhibit the ability to disperse particulate matter and thus prevent soils which have been removed from the article from agglomerating and re-adhering to the surface of the cleaned article. Machine dishwasher formulations differ from home laundry compositions in that most dishwashers require higher wash temperatures. Dishwashing machines typically utilize internal heating elements to increase the temperature of the tap water to the optimum. Under these conditions, the heating element often forms surface deposits which significantly reduce its efficiency. Polymers which can be used to remove these deposits are thus often added to machine dish formulation. The polymers must be hydrothermally stable at the higher wash temperatures.

In addition, machine dishwashing formulations vary from those for fabric laundering in that the dishwashing formulation contain cleaning agents that must be low foaming and, preferably, contain foam suppressors. As such, anionic surfactants, which conventionally are used to aid in antideposition in fabric laundering, are not used to a large extent in the automatic dishwashing detergents due to their tendency to cause foaming. Rather, nonionic surfactants typically are employed. Polymers known heretofore for such uses, which polymers typically are polyelectrolytes, have been found to be unstable in the presence of high concentrations of nonionic surfactants. For instance, the use of nonionic surfactants and anionic surfactants in combination with polyelectrolytes in a liquid detergent composition is disclosed in JP 61-120435. As indicated therein, in order to prepare stable liquid detergent compositions which contain polyelectrolytes, water and nonionic surfactants, solubilizing agents must be used. Allyloxybenzenesulfonates have been copolymerized with acrylonitrile. The fibers produced from such copolymers have been found to have good basic and cationic dye receptivity. Methods for preparing the allyloxybenzenesulfonate monomers, the copolymerization of the monomers with acrylonitrile alone and with other olefinic monomers, and the fibers thereof are described in detail in the following references: Chemical Abstracts Volume 78 (1973), 78:84025h; U.S. Pat. No. 3,410,835 (issued Nov. 21, 1968 to C. Mazzolini, et al.); U.S. Pat. No. 3,426,104 (issued Feb. 4, 1969 to J. Masson); U.S. Pat. No. 4,163,089 (issued Jul. 31, 1979 to G. Palethorpe); U.S. Pat. No. 4,265,970 (issued May 5, 1981 to H. Bach); and U.S. Pat. Nos. 4,293,613 and 4,294,884 (issued Oct. 6 and Oct. 13, 1981 respectively, to H. Bach, et al.).

While allyloxybenzenesulfonate monomer and the alkali metal salts of methallyl sulfonic acid have each been used independently in the treatment of water, including detergent compositions, which contains inorganic particulate matter, none of the above references disclose or suggest the compositions of the present invention or their use in aqueous systems containing inorganic particulate matter.

In the present invention, unexpected synergistic properties are realized by combining an allyloxybenzenesulfonic acid monomer, a methallyl sulfonic acid monomer, a copolymerizable unsaturated carboxylic acid monomer and an alkyl ester monomer, in certain molar ratios. The novel compositions allow the replacement of a major portion of the relatively expensive allyloxybenzenesulfonic acid monomer with the relatively less expensive methallyl sulfonic acid monomer, without loss of the polymer's ability to inhibit the formation and deposition of inorganic mineral scale in an aqueous system and to disperse inorganic particulate matter in aqueous systems. In addition, the polymers of the present invention unexpectedly have been found to resolubilize and to stabilize pre-existing mineral scale deposits in such aqueous systems. Finally, the polymers of the present invention surprisingly were discovered to provide stable aqueous systems comprising the polymer, a nonionic surfactant and water, without requiring the use of a solubilizing agent.

SUMMARY OF THE INVENTION

According to the present invention, novel water soluble polymers prepared from an allyloxybenzenesulfonic acid monomer, a methallyl sulfonic acid monomer, a copolymerizable nonionic monomer, and a copolymerizable olefinically unsaturated carboxylic acid monomer are provided. The water soluble polymers are prepared by polymerizing together at least 2.5 mole percent of an allyloxybenzenesulfonic acid monomer represented by the chemical structure (I):

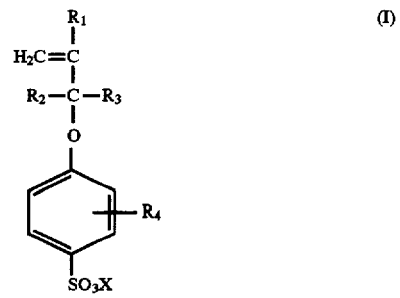

wherein $R_1$, $R_2$, $R_3$, and $R_4$ are independently hydrogen or $C_1$-$C_6$ alkyl; and X is hydrogen, an alkali or alkaline earth metal or ammonium; at least about 0.5 mole percent of methallyl sulfonic acid monomer, as defined herein; from about 10 to 20 mole percent of a copolymerizable nonionic monomer represented by the chemical structure III, as defined herein, and from 60 to 87 mole percent of a copolymerizable olefinically unsaturated carboxylic acid monomer, as defined herein. The invention is also directed to aqueous compositions which contain the polymer, a nonionic surfactant and water, and which are stable to phase separation without the use of a solubilizing agent, such as a hydrotrope.

DETAILED DESCRIPTION OF THE INVENTION

The water soluble polymers of the present invention comprise a unique combination of two distinct sulfonated monomers with at least two other copolymerizable monomers, as defined herein. The combination of the sulfonated monomers combines hydrophobic character, aromatic structure and high charge density. Unexpectedly, this unique combination of sulfonated and copolymerizable monomers has resulted in water soluble polymers which exhibit multifunctional performance characteristics which have not been reported heretofore in the treatment of aqueous systems. In addition, it was found unexpectedly that the polymers may be incorporated into aqueous compositions which contain high concentrations of nonionic surfactant and which do not contain solubilizing agents, and yet the polymer and nonionic surfactant are stable to phase separation in the aqueous composition. The polymers provide excellent scale inhibition and deposition control under a wide variety of conditions. For instance, the inventive polymers have been found to be as effective, and in some cases, more effective, in the inhibition of calcium phosphate scale formation and deposition than commercial water treatment polymers prepared from acrylic acid and 2-acrylamido-2-methyl propane sulfonic acid monomer. Additionally, the polymers will inhibit the deposition of silica, silicate anions and oxalate anions.

In cooling water treatments, phosphonates and low molecular weight homopolymers are recognized as the primary calcium carbonate threshold inhibitors. The composition and the molecular weight of the inventive polymers are such that the inventive polymers act as a dispersant and crystal modifier, thereby contributing to the inhibition of the formation and deposition of the calcium carbonate. Zinc is commonly used for cathodic corrosion protection in cooling water formulations. Zinc precipitates at the pH of the bulk water unless sufficiently stabilized, i.e., maintained in solution. It is important to stabilize zinc at the pH of the aqueous system so that it is available to react at the corrosion site where the pH is higher than that of the bulk water. The selection of a polymer is critical in this application, as overstabilization of the zinc will prevent it from functioning as a corrosion inhibitor. The inventive polymers have been found to provide the required level of stabilization and thus to be effective at stabilizing zinc.

The inventive polymers also have been found to be effective at dispersing and stabilizing iron. In addition, the polymers' stability under stressed conditions provides superior performance in cooling water systems operating at high cycles of concentration.

The polymers are highly effective at dispersing silt, sludge and other contaminates, including corrosion products and microbial debris. The polymers also are effective at dispersing particulate matter such as pigments, clays, salts, metallic ores and metallic oxides. Specific examples include, without limitation, iron oxide, kaolin clay, titanium dioxide, calcium carbonate and aluminum oxide. Surprisingly, the polymers of the present invention have been found to provide a synergistic "inhibition characteristic", in that the polymers are able to resolubilize or redisperse and stabilize preexisting phosphate, zinc, and iron deposits in situ in aqueous systems, while commercial water treatment polymers prepared from acrylic acid and 2-acrylamido-2-methyl propane sulfonic acid monomer were found not to provide such performance characteristics.

The performance of the inventive polymers in formulated water treatment compositions is as good as or not significantly less than the performance of the polymer when used neat in the aqueous system. While the performance of conventional water treatment polymers may be dependent upon and perhaps degraded by the particular type of water treatment composition in which it is utilized, the performance of the inventive polymers have been found to be unaffected in a wide range of water treatment compositions and conditions. For instance, the polymers are stable both at high and low pH, and thus may be used in a broad pH range. When compared to polymers prepared from acrylic acid and 2-acrylamido-2-methyl propane sulfonic acid monomer, the inventive polymers were found to be stable, while the acrylic acid/2-acrylamido-2-methyl propane sulfonic acid monomer polymers exhibited a loss of performance once formulated into the same water treatment composition.

In those aqueous systems where polymer thermal stability is an issue, the inventive polymers demonstrate superior thermal stability characteristics when compared to acrylic acid/2-acrylamido-2-methyl propane sulfonic acid copolymers or terpolymers. The superior thermal stability and dispersant characteristics of the inventive polymers make them especially useful for use in boilers which operate at high temperatures and in automatic dishwasher detergent compositions which are subjected to high temperatures of wash water.

Preferred polymeric materials of the invention herein are those produced from an allyloxybenzenesulfonic acid monomer having the chemical formula (II),

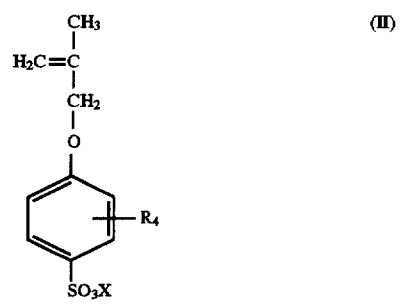

wherein $R_4$ is hydrogen or $C_1$–$C_6$ alkyl; and X is hydrogen, an alkali or alkaline earth metal (preferably sodium or potassium), or ammonium; (b) a methallyl sulfonic acid monomer; (c) a copolymerizable nonionic monomer; and (d) a copolymerizable olefinically unsaturated carboxylic acid monomer.

As used herein, allyloxybenzenesulfonic acid (ABS) monomer is intended to include monomers selected from the group consisting of allyloxybenzenesulfonic acid and salts thereof, as defined in chemical structure I. The allyloxybenzenesulfonate monomers, which are not new, may be prepared by well-known processes illustrated, for example, by U.S. Pat. No. 3,426,104. The allyloxybenzenesulfonate monomers found to be particularly useful herein are p-methallyloxybenzenesulfonic acid and salts thereof. The water soluble polymers of the present invention comprise at least 2.5 mole percent of the allyloxybenzenesulfonic acid monomer, preferably from 2.5 to 10 mole percent, more preferably from 3.5 to 8 mole percent and even more preferably from 3.5 to 6 mole percent. As used herein, methallyl sulfonic acid (MS) monomer is intended to include monomers selected from the group consisting of methallyl sulfonic acid and the alkali or alkaline earth metal or ammonium salts thereof. Preferred monomers are the alkali metal salts of methallyl sulfonic acid. Preferred alkali metals are sodium and potassium. Particularly preferred is sodium methallyl sulfonate (SMS). The water soluble polymers comprise at least 0.5 mole percent of the methallyl sulfonic acid monomer, preferably from 0.5 to 10 mole percent, more preferably from 2.5 to 8 mole percent, and even more preferably from 2.5 to 6 mole percent. It is preferred that as little of the ABS and MS monomers as possible be used in preparing the polymers of the present invention. The monomers are present in amounts effective to produce the required water treatment performance, i.e., scale inhibition, dispersancy, stabilization, and the like. Additionally, of the total amount of ABS and MS monomers used, it is preferred to minimize the level of ABS, as the ABS monomer is relatively expensive compared to the MS monomer. Accordingly, as much of the ABS monomer as is possible is replaced with the MS monomer. The ABS:MS molar ratio may range from 11:1 to 1:2, preferably from 3.5:2.5 to 1:1.5.

As used herein, a copolymerizable olefinically unsaturated carboxylic acid monomer is intended to include aliphatic, branched or cyclic, mono- or dicarboxylic acids, the alkali or alkaline earth metal or ammonium salts thereof, and the anhydrides thereof. Preferred monocarboxylic acid monomers include acrylic acid, methacrylic acid and ethacrylic acid, and combinations thereof (the "acrylic" monomer). The acrylic monomers useful in the production of the polymers of this invention are the olefinically unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group, or as a part of a terminal methylene grouping.

Useful olefinically unsaturated acids of this class include such widely divergent materials as the acrylic acid comonomers typified by acrylic acid itself, methacrylic acid, ethacrylic acid, alpha-chloro-acrylic acid, alpha-cyano acrylic acid, alpha-chloro-acrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, and tricarboxy ethylene. For the polycarboxylic acid monomers, an anhydride group is formed by the elimination of one molecule of water from two carboxyl groups located on the same polycarboxylic acid molecule. The preferred carboxylic monomers for use in this invention are the monoolefinic acrylic acids having a substituent selected from the class consisting of hydrogen, halogen and hydroxyl groups, monovalent alkyl radicals, monovalent aryl radicals, monovalent aralkyl radicals, monovalent alkaryl radicals and monovalent cycloaliphatic radicals. As used herein, (meth)acrylic acid is intended to include acrylic acid and methacrylic acid. The water soluble polymers of the present invention comprise at least 60 mole percent of the copolymerizable unsaturated carboxylic acid monomer, preferably from 60 to 87 mole percent, more preferably from 70 to 87 mole percent, and even more preferably from 75 to 85 mole percent. Preferred unsaturated carboxylic acid monomers are acrylic and methacrylic acid, more preferably acrylic acid.

As used herein, copolymerizable nonionic monomer is intended to include monomers represented by the chemical structure III

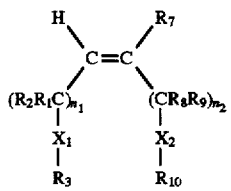

wherein $n_1$ and $n_2$ are independently 0 to 10; $R_1$, $R_2$, $R_8$ and $R_9$ are independently hydrogen, $C_1$–$C_6$ alkyl, or $C_1$–$C_6$ alkyl-substituted aryl; $R_7$ is hydrogen, $C_1$–$C_6$ alkyl, or $CO_2X$, where X is hydrogen, an alkali or alkaline earth metal or $C_1$–$C_6$ alkyl; $X_1$ and $X_2$ are absent or are independently O, C=O, or hydrogen; $R_3$ is absent or is C=OR$_4$, OR$_4$, NR$_5$R$_6$, $C_1$–$C_{18}$ alkyl or hydrogen, where $R_4$ is $C_1$–$C_{18}$ alkyl or hydrogen and $R_5$ and $R_6$ are independently hydrogen, $C_1$–$C_6$ alkyl, or an alkyloxyether or alcohol; and $R_{10}$ is absent or is C=OR$_{11}$, OR$_{11}$, NR$_{12}$R$_{13}$, $C_1$–$C_{18}$ alkyl, or hydrogen, where $R_{11}$ is $C_1$–$C_{18}$ alkyl or hydrogen, $R_{12}$ and $R_{13}$ are independently hydrogen, $C_1$ to $C_6$ alkyl, or an alkyloxyether or alcohol.

The nonionic monomer is preferably selected from the group consisting of $C_1$–$C_6$ alkyl esters of (meth)acrylic acid and the alkali or alkaline earth metal or ammonium salts thereof, acrylamide and the $C_1$–$C_6$ alkyl-substituted acrylamides, the N-alkyl-substituted acrylamides and the N-alkanol-substituted acrylamides. Also useful are the $C_1$–$C_6$ alkyl esters and $C_1$–$C_6$ alkyl half-esters of unsaturated vinylic acids, such as maleic acid and itaconic acid, and $C_1$–$C_6$ alkyl esters of saturated aliphatic monocarboxylic acids, such as acetic acid, propionic acid and valeric acid. Preferred nonionic monomers are selected from the group consisting of methyl (meth)acrylate, mono- and dimethyl maleate, mono- and di-ethyl itaconate, and (meth)allyl acetates, propionates and valerates. Particularly preferred is methyl methacrylate. The water soluble polymers of the present invention contain from 10 to 20 mole percent of the nonionic monomer, preferably from 12 to 18 mole percent. At levels below 10 mole percent, a significant decrease in scale inhibition properties of the polymer is noted. Minor amounts of crosslinking monomers such as diallyl maleate, alkylene bisacrylamide and triallyl cyanurate may also be employed herein.

The weight average molecular weight of the polymers ranges widely, including polymers from about 1,000 to 50,000. For the applications described herein, the preferable molecular weight range is about 5,000 to 20,000.

The polymers of the present invention may be prepared by any number of conventional means well known to those skilled in the art including, for instance, such techniques as bulk, emulsion, suspension, precipitation, or preferably solution polymerization.

The polymers are preferably prepared in an aqueous medium in the presence of any catalyst capable of liberating free radicals under the reaction conditions employed. Suitable catalysts include peroxides such as benzoyl peroxide, azo compounds such as azobisisobutyronitrile, and salts of peracids (e.g., sodium or potassium persulfate). Redox systems employing, for example, t-butyl hydroperoxide may also be employed. The molecular weight of the polymers may be controlled by various compounds used in the art including for example chain transfer agents such as mercaptans, ferric and cupric salts, bisulfites, and lower alcohols (preferably isopropanol).

The polymers may be added neat to the aqueous systems or may be formulated into various water treatment compositions which may then be added to the aqueous systems. In certain aqueous systems where large volumes of water are continuously treated to maintain low levels of deposited matter, the polymers may be used at levels as low as 0.5 mg/L. The upper limit on the level of polymer used will be dependent upon the particular aqueous system to be treated. For example, when used to disperse particulate matter the polymer may be used at levels ranging from 0.5 to 2,000 mg/L. When used to inhibit the formation or deposition of mineral scale the polymer may be used at levels ranging from 0.5 to 100 mg/L, preferably from 3 to 20 mg/L, more preferably from 5 to 10 mg/L.

Once prepared, the water soluble polymers are preferably incorporated into a water treatment composition comprising the water soluble polymer and other water treatment chemicals. Such other chemicals include corrosion inhibitors such as orthophosphates, zinc compounds and tolyltriazole. As indicated above, the level of the inventive polymer utilized in the water treatment compositions will be determined by the treatment level desired for the particular aqueous system to be treated. The water treatment compositions generally contain from about 10 to 25 percent by weight of the water soluble polymer. Conventional water treatment compositions are known to those skilled in the art and exemplary water treatment compositions are set forth below.

| Formulation 1 | Formulation 2 |
| --- | --- |
| 11.3% Polymer (40% active) | 11.3% Polymer (40% active) |
| 47.7% Water | 59.6% Water |
| 4.2% HEDP | 4.2% HEDP |
| 10.3% NaOH | 18.4% TKPP |
| 24.5% Sodium Molybdate | 7.2% NaOH |
| 2.0% Tolyltriazole | 2.0% Tolyltriazole |
| pH 13.0 | pH 12.6 |

| Formulation 3 | Formulation 4 |
| --- | --- |
| 22.6% Polymer (40% active) | 11.3% Polymer (40% active) |
| 51.1% Water | 59.0% Water |
| 8.3% HEDP | 4.2% HEDP |
| 14.0% NaOH | 19.3% NaOH |
| 4.0% Tolyltriazole | 2.0% Tolyltriazole |
|  | 4.2% ZnCl2 |
| pH 12.5 | pH 13.2 |

In detergent applications, the efficacy of the polymers will be most noticeable in sodium carbonate (soda ash) based powdered detergents and in detergents wherein up to 100 weight percent of a zeolite builder system is replaced with a combination of soda ash and polymer (typically in a ratio of about 160:1 to 8:1 soda ash: polymer). The polymer is believed to improve detergency as a co-builder and to inhibit soil redeposition and water hardness salt deposition. The polymer may be used as a processing aid during blending, drying and agglomerating operations to provide uniform distribution of the components of detergent compositions, to provide desired particle size and density, and to provide other desirable attributes during manufacture and storage of detergents, especially powdered detergents.

Typical detergent formulations which may be improved by the addition of the polymer of this invention are disclosed in U.S. Pat. Nos. 4,663,071, issued May 5, 1987 to Bush, et al., 4,906,397, issued Mar. 6, 1990 to Leighton, et al., 5,149,455, issued Sep. 22, 1992 to Jacobs, et al., 5,160,657 issued Nov. 3, 1992 to Bortolotti, et al., and 5,164,108, issued Nov. 17, 1992 to Appel, et al., also 5,061,396, issued Oct. 29, 1991 to Iovine et al., and 5,087,682, issued Feb. 11, 1992 to Iovine et al., all of which are hereby incorporated by reference.

Aqueous compositions which may be improved by the addition of the polymers of this invention include detergent compositions comprising 0 to 80 weight percent soda ash, from 5 weight percent to about 70 weight percent surfactant and from about 0.5 weight percent weight percent to about 40 weight percent of the polymer. Included herein are any detergent formulations, used commercially or experimentally, which employ a phosphate co-builder or phosphate-replacer builder or co-builder or any builder which functions chiefly to sequester calcium, magnesium, barium and other polyvalent cations present in hard water. Formulations employing mixtures of builders, including phosphate-containing mixtures, are also useful. The polymer may be used as a co-builder, a builder, an antiredeposition agent, an antiencrustation agent, and as a processing aid in these detergents.

Optional components of the detergent formulations include, but are not limited to, ion exchangers, alkalies, anticorrosion materials, antiredeposition materials, optical brighteners, fragrances, dyes, fillers, chelating agents, enzymes, fabric whiteners and brighteners, sudsing control agents, solvents, bleaching agents, bleach precursors, buffering agents, soil removal agents, soil release agents, fabric softening agent and opacifiers. These optional components may comprise up to about 90 weight percent of the detergent formulation.

In a preferred embodiment, the polymer is incorporated into a liquid detergent formulation, comprising water, from about 10 weight percent to about 40 weight percent of polymer, from 5 weight percent to about 70 weight percent surfactant(s), from about 2 weight percent to about 55 weight percent builder(s), and from about 15 weight percent to about 95 weight percent of a combination of optional ingredients, such as buffers, enzymes, softeners, antistatic agents, fluorescent materials, perfumes and fillers. The surfactant may be nonionic, anionic, or mixtures thereof. However, the composition must contain at least 5 weight percent of a nonionic surfactant and preferably contains from about 10 weight percent to about 70 weight percent of a nonionic surfactant, and even more preferably from about 15 weight percent to about 65 weight percent of a nonionic surfactant. Such compositions are phase-stable, meaning that the polymer and the nonionic surfactant remain in one phase without the use of a solubilizing agent, and the polymer and surfactant do not separate into two discrete phases upon standing, e.g., storage, even in the absence or substantial absence of the solubilizing agent.

While the phase-stable mixture of polymer, nonionic surfactant and water particularly are useful in liquid detergent compositions, they may be used in any aqueous compositions where high levels of nonionic surfactant and phase-stability are required. Such compositions include, without limitation, cleaning products such as liquid machine and hand dishwashing compositions, liquid body soap and the like. Additionally the stable aqueous compositions may be employed in textile applications in the form of scours, bleach baths, dying compositions, fabric finishing and the like.

Exemplary nonionic surfactants which may be employed in the stable aqueous compositions of the invention include alkoxylated alcohols, alkoxylated amines, alkoxylated nonyl-phenol, alkylaryl alkoxylates and zwitterionic species such as betaines. Specific examples of such nonionic surfactants include $C_9$–$C_{15}$ alkoxylated alcohols containing from 6 to 9 moles of ethylene oxide, available from Shell Chemicals under the Neodol tradename. Exemplary anionic surfactants which may be employed in the stable aqueous compositions of the invention include alkylaryl sulfonates, alkyl sulfonates, alkyl sulfates, alkyl ether sulfates, phosphate esters and phosphonates.

By solubilizing agent, it is meant an agent which is known to prevent the separation, precipitation, agglomeration, flocculation or aggregation of otherwise incompatible species within the useful life of the mixture. By "substantially free of a solubilizing agent", it is meant that the compositions do not contain a solubilizing agent at levels which would materially alter the properties of the composition. Preferably, the compositions comprise less than 1 weight percent, preferably less than 0.5 weight percent of a solubilizing agent, based on the total weight of the composition. Most preferably, the compositions are free of solubilizing agents. Exemplary solubilizing agents which typically are used in aqueous compositions containing polyelectrolytes and high levels of nonionic surfactants include ethanol; lower alkylbenzenesulfonic acid salts, such as benzene sulfonate and p-toluene sulfonate; glycols, such as propylene glycol; or solubilizers such as acetylbenzene sulfonate, acetoamides, pyridine dicarboxilic acid amides, benzoic acid and urea. Such solubilizers conventionally are used at levels ranging from 1 weight percent to 10 weight percent of the composition.

The following examples are intended to exemplify the present invention but are not intended to limit the scope of the invention in any way. The breadth and scope of the invention are to be limited solely by the claims appended hereto.

EXAMPLE 1

A series of polymers was prepared according to the above-noted procedure. Polymer compositions so prepared are set forth in mole percentage in Table 1. Each polymer was evaluated according to the phosphate inhibition test protocol to determine its efficacy in phosphate inhibition, relative to a commercial water treatment polymer prepared from acrylic acid and 2-acrylamido-2-methyl propane sulfonic acid monomer. The phosphate inhibition results are set forth in Table 2.

Phosphate Inhibition Test Protocol

Solution "A"

Using sodium hydrogen phosphate and sodium tetraborate decahydrate, Solution A was prepared containing 20 mg/L of phosphate, and 98 mg/L of borate at a pH of from 8.0–9.5.

Solution "B"

Using calcium chloride dihydrate and ferrous ammonium sulfate, Solution B was prepared containing 400 mg/L of calcium and 4 mg/L of iron at a pH of from 3.5–7.0.

Antiscalant Preparation

The total solids or activity for antiscalant(s) to be evaluated was determined. The weight of antiscalant necessary to provide a 1.000 g/L (1000 mg/L) solids/active solution was determined using the following formula:

(% solids or activity)/100%="X"

"X"=decimal solids or decimal activity.

(1.000 g/L)/"X"=g/L antiscalant to yield a 1000 mg/L antiscalant solution

Sample Preparation

Fifty (50) ml of Solution "B" was dispensed into a 125 ml Erlenmeyer flask using a Brinkman dispensette. Using a graduated pipet, the correct amount of antiscalant polymer solution was added to give the desired treatment level (i.e., 1 ml of 1000 mg/L antiscalant solution=10 mg/L in samples). Fifty (50) ml of Solution "A" was dispensed into the 125 ml Erlenmeyer flask using a Brinkman dispensette. Using a Brinkman dispensette, at least three blanks (samples containing no antiscalant treatment) were prepared by dispensing 50 ml of Solution "B" and 50 ml of Solution "A" to a 125 ml Erlenmeyer flask. The flasks were stoppered and placed in a water bath set at 70° C.±5° C. for 16 to 24 hours.

Sample Evaluation

All of the flasks were removed from the water bath and allowed to cool to the touch. A vacuum apparatus was assembled using a 250 ml side-arm Erlenmeyer flask, vacuum pump, moisture trap, and Gelman filter holder. The samples were filtered using 0.2 micron filter paper. The filtrate from the 250 ml side-arm Erlenmeyer flask was transferred into an unused 100 ml specimen cup. The samples were evaluated for phosphate inhibition using a HACH DR/3000 Spectrophotometer, following the procedure set forth in the operator's manual.

Calculate The Percent Inhibition For All Samples

The percent inhibition for each treatment level is determined by using the following calculation.

$$\frac{S}{T} \times 100\% = \% \text{ Inhibition}$$

S=mg/L Phosphate for Sample
T=mg/L Total Phosphate added

TABLE 1

| POLYMER | 2A2MPS[1] | AA[2] | MMA[3] | ABS[4] | SMS[5] |
|---------|-----------|-------|--------|--------|--------|
| C1 | 10 | 90 | | | |
| 1A | — | 80 | 13 | — | 7 |
| 1B | — | 80 | 13 | 7 | — |
| 1C | — | 83.5 | 13 | — | 3.5 |
| 1D | — | 83.5 | 13 | 3.5 | — |
| 1E | — | 81 | 13 | 3.5 | 2.5 |
| 1F | — | 80 | 13 | 3.5 | 3.5 |
| 1G | — | 75 | 18 | 3.5 | 3.5 |
| 1H | | 86 | 7 | 3.5 | 3.5 |

[1] 2-acrylamido-2-methyl propane sulfonic acid
[2] Acrylic acid
[3] Methyl methacrylate
[4] Allyloxybenzenesulfonic acid
[5] Sodium methallyl sulfonate

TABLE 2

| | % PHOSPHATE INHIBITION AT X mg/L POLYMER TREATMENT LEVEL | | | | | mg/L[1] |
|---------|-------|-------|-------|-------|-------|--------|
| POLYMER | 13[2] | 15[2] | 17[2] | 19[2] | 21[2] | AT 90% I |
| C1 | 12.4 | 27.5 | 66.4 | 93.0 | 92.3 | 18.5 |
| 1A | 10.9 | 10.9 | 13.3 | 68.9 | 92.4 | 20.5 |
| 1B | 10.1 | 13.2 | 80.0 | 92.3 | 92.1 | 18.5 |
| 1C | 10.4 | 11.0 | 12.2 | 42.6 | 88.5 | >21 |
| 1D | 10.4 | 11.0 | 24.0 | 95.6 | 97.7 | 18.5 |
| 1E | 8.5 | 12.1 | 79.4 | 92.1 | 92.4 | 18.1 |
| 1F | 9.8 | 14.0 | 84.7 | 93.0 | 93.4 | 17.8 |
| 1G | 13.2 | 18.8 | 86.6 | 91.2 | 92.4 | 18.7 |
| 1H | 10.7 | 12.4 | 14.8 | 72.3 | 94.6 | 20.0 |

[1] Treatment level required to attain 90% inhibition.
[2] mg/L

As the results in Table 2 indicate, the commercial polymer (Polymer C1) attained 90% inhibition at a treatment level of 18.5 mg/L. Polymers containing 3.5 mole percent of ABS (Polymer 1D) or SMS (Polymer 1C) attained 90% inhibition at treatment levels of 18.5 and greater than 21 mg/L, respectively. At 7 mole percent, the polymer containing ABS (Polymer 1B) attained 90% inhibition at a treatment level of 18.5 mg/L, while the polymer containing SMS (Polymer 1A) required 20.5 mg/L to achieve 90% inhibition. When ABS and SMS are used in combination at molar ratios of 3.5:3.5 (Polymer 1F) and 3.5:2.5 (Polymer 1E), 90% inhibition is attained at 17.8 mg/L and 18.1 mg/L, respectively. The inventive polymers exhibit greater inhibition efficacy than the commercial acrylic acid/2-acrylamido-2-methyl propane sulfonic acid polymer (C1) and are as good as or better than the polymer containing 7 mole percent of ABS (1B). It was discovered that significant portions of the ABS monomer could be replaced with the SMS polymer without a significant loss of inhibition efficacy. This is particularly surprising when one considers that SMS was not as effective as ABS in phosphate inhibition. At best, one would be lead to believe that replacing one-half of the ABS with the SMS would have resulted in significant loss of inhibition efficacy. This synergistic effect allows one to replace the relatively more expensive ABS polymer with the relatively less expensive SMS monomer without losing inhibition efficacy.

As seen in Table 2, the level of the nonionic monomer in the inventive polymers is critical to phosphate inhibition efficacy. Polymers containing between 10 and 20 mole percent of MMA, i.e., 13 (Polymer 1F) and 18 (Polymer 1G) mole percent, respectively, required treatment levels of 17.8 mg/L and 18.7 mg/L respectively, to attain 90% inhibition. The polymer which contained less than 10 mole percent of MMA (1H) required 20 mg/L to attain 90% inhibition, which is inferior to both the commercial polymer and to the inventive polymers. The upper limit on the nonionic monomers is limited by minimum levels required of the other monomers utilized in preparing the inventive polymers.

EXAMPLE 2

A series of polymers was prepared as above. Polymer compositions so prepared are set forth in mole percentage in Table 3. Each polymer was evaluated according to the phosphate inhibition test protocol to determine its efficacy in phosphate inhibition relative to a commercial polymer prepared from acrylic acid and 2-acrylamido-2-methyl propane sulfonic acid monomer. The phosphate inhibition results are set forth in Table 4.

TABLE 3

| POLYMER | 2A2MPS | AA | MMA | ABS | SMS |
|---|---|---|---|---|---|
| 2A | — | 81 | 13 | 5.5 | 0.5 |
| 2B | 6 | 81 | 13 | — | — |
| 2C | — | 81 | 13 | 6 | — |
| 2D | 3.5 | 80 | 13 | — | 3.5 |
| 2F | 3.5 | 81 | 13 | — | 2.5 |
| 2G | 3.5 | 83.5 | 13 | — | — |
| 2H | — | 83.5 | 13 | 3.5 | — |
| C1 | 10 | 90 | | | |

TABLE 4

| POLYMER | % PHOSPHATE INHIBITION AT X mg/L POLYMER TREATMENT LEVEL | | | | | mg/L[1] |
|---|---|---|---|---|---|---|
|  | 13[2] | 15[2] | 17[2] | 19[2] | 21[2] | AT 90% I |
| 2A | 14.0 | 21.2 | 92.4 | 96.4 | 98.3 | 16.8 |
| 2B | 18.2 | 48.0 | 95.6 | 96.2 | 96.8 | 16.5 |
| 2C | 12.0 | 18.2 | 86.4 | 94.0 | 95.8 | 17.2 |
| 2D | 15.4 | 23.1 | 82.4 | 97.3 | 97.6 | 17.5 |
| 2F | 13.2 | 17.1 | 51.1 | 96.5 | 98.2 | 18.3 |
| 2G | 11.9 | 15.8 | 61.9 | 96.8 | 97.2 | 18.4 |
| 2H | 10.4 | 11.0 | 24.0 | 95.6 | 97.7 | 18.5 |
| C1 | 13.2 | 14.7 | 55.1 | 94.2 | 97.8 | 18.7 |

[1]Treatment level required to attain 90% inhibition.
[2]mg/L

As indicated by the results in Table 4, the polymer showing the best phosphate inhibition was an acrylic acid/methyl methacrylate/2-acrylamido-2-methyl propane sulfonic acid terpolymer (Polymer 2B), followed very closely by the inventive polymer 2A. It was surprising to find that inventive polymer 2A (5.5 mole ABS/0.5 mole SMS) performed slightly better than polymer 2C, which contained only the ABS (6 mole) sulfonated monomer. It was observed that when 2.5 mole percent of the 2-acrylamido-2-methyl propane sulfonic acid monomer were replaced with SMS (Polymer 2F), the inhibition performance was significantly reduced. While this result would be expected in view of the phosphate inhibition results of Polymers 1A–1D, it is contrary to the results noted for Polymers 1E–1G. This indicates that the synergistic effect noted when ABS is combined with SMS is unique to the combination of the ABS and SMS and not inherent in all combinations of SMS and other sulfonated monomers, such as the 2-acrylamido-2-methyl propane sulfonic acid.

EXAMPLE 3

A field trial was conducted to compare the efficacy of an inventive polymer to a commercial water treatment polymer prepared from acrylic acid and 2-acrylamido-2-methyl propane sulfonic acid monomer (10:90 molar ratio). Specifically, it was intended to demonstrate the polymer's ability to inhibit calcium phosphate in an aqueous system where phosphate was added to control mild steel corrosion. The aqueous system was a 500 ton open recirculating cooling tower. The tower supplied cooling water for two 250 ton chillers. The chillers, in turn, supply water for both air conditioning and process cooling. It is important to note that the make-up water (raw water entering the system) is of good quality (Table 5). In particular, it is noted that the concentrations of zinc, iron and phosphate are all below 0.1 mg/L. Before the trial began, a sample of sludge deposits from the basin of the cooling tower was collected and characterized (See Table 6). It is important to note that the deposit contained significant levels of zinc, iron and phosphate.

The water treatment composition utilized for the trial was a "stabilized phosphate" formulation containing from 8 to 12 mg/L of phosphate, 7 to 10 mg/L of the water soluble polymer, 1 to 2 mg/L of tolyltriazole, 3 to 5 mg/L of 1-hydroxyethylidene-1,1-diphosphonic acid (HEDP) and 3 to 5 mg/L of molybdenum. The phosphate was added to control mild steel corrosion, tolyltriazole to control yellow metal corrosion, i.e., copper and brass, HEDP to control hardness and the water soluble polymer to stabilize the phosphate; i.e., prevent calcium phosphate precipitation where calcium is available from the make-up water. Molybdate is added as a tracer/mild steel corrosion control.

A water treatment composition comprising the commercial polymer was used in the cooling tower for a period of four weeks. Thereafter, a water treatment composition comprising an ABS/SMS/AA/MMA polymer according to the present invention was utilized to treat the cooling tower water for a period of five weeks.

It was expected that both the commercial copolymer and the inventive polymer should prevent deposition of calcium carbonate scale, control precipitated solids via dispersion, and maintain the 8 to 12 mg/L phosphate added to the system in suspension. As expected, both compositions adequately prevented deposition of calcium carbonate scale and both compositions stabilized the phosphate added to the system. Observation of the tower basin before and after the trial noted that there had been a significant reduction in sludge deposited in the basin after the trial had been completed. Analysis of the cooling water for total phosphate, iron and zinc (Table 7) over the test period indicated that the inventive composition solubilized and stabilized more phosphate than was added to the system during the trial, as evidenced by the soluble phosphate levels measured in the water versus the known amount added to the system.

TABLE 5

Water Analyses
Before Polymer Feed

DATA IN mg/L
EXCEPT pH AND CONDUCTIVITY

| PARAMETER | AS | RAW WATER | TOWER WATER | CYCLES |
|---|---|---|---|---|
| pH | pH | 6.73 | 8.12 | |
| Conductivity | umhos | 336 | 1520 | 4.5 |
| Total alkalinity | CaCO3 | 50.3 | 207 | 4.1 |
| Total suspended solids | mg/L | <0.1 | 11.6 | |
| Aluminum | Al | <0.1 | <0.1 | |
| Boron | BO3 | 0.33 | 2.42 | |
| Calcium | CaCO3 | 80.3 | 398 | 5.0 |
| Copper | Cu | 0.03 | 0.04 | |
| Iron | Fe | 0.06 | 0.25 | 4.2 |
| Lead | Pb | <0.01 | <0.01 | |
| Magnesium | CaCO3 | 35 | 175 | 5.0 |
| Manganese | Mn | 0.01 | 0.04 | 4.0 |
| Molybdenum | Mo | <0.01 | 0.08 | |
| Sodium | Na | 16 | 88.2 | 5.5 |
| Strontium | Sr | 0.16 | 0.77 | 4.8 |
| Sulfate | SO4 | 55.3 | 316 | 5.7 |
| Zinc | Zn | 0.08 | 0.79 | |
| Chloride | Cl | 32 | 177 | 5.5 |
| Fluoride | F | <0.1 | <0.1 | |
| Nitrate | N | 1.16 | 8.92 | |
| Nitrite | N | <0.05 | <0.05 | |
| Phosphorus - inorganic | PO4 | <0.1 | 2.61 | |
| Phosphorus - organic | PO4 | <0.1 | <0.1 | |
| Phosphorus - ortho | PO4 | <0.1 | <0.1 | |
| Silica | SiO2 | 9.4 | 42.8 | 4.6 |
| Sulfate | SO4 | 55.3 | 316 | 5.7 |
| LSI | LSI | −1.33 | 1.27 | |

TABLE 6

Deposit Analysis
Before Polymer Feed

| PARAMETER | AS | WEIGHT PERCENT |
|---|---|---|
| Calcium | CaCO3 | 42.25 |
| Silica | SiO2 | 12.70 |

TABLE 6-continued

Deposit Analysis
Before Polymer Feed

| PARAMETER | AS | WEIGHT PERCENT |
|---|---|---|
| Iron | Fe2O3 | 12.45 |
| Zinc | Zn(OH)2 | 2.59 |
| Magnesium | CaCO3 | 2.18 |
| Aluminum | Al2O3 | 2.08 |
| Phosphorus | PO4 | 1.05 |
| Sodium | Na2O | 0.49 |
| Potassium | K2O | 0.33 |
| All others | Percent | 0.25 |
| Subtotal | | 76.37 |
| Loss @ 850 C. | | 32.40 |
| Total | | 108.77 |

TABLE 7

| | Week 1 | Week 2 | Week 3 | Week 4 | Week 5 |
|---|---|---|---|---|---|
| Phosphate (mg/L) | | | | | |
| Commercial Polymer | 12.5 | 11.4 | — | 8.7 | — |
| Inventive Polymer | 33.8 | 22.7 | 25.2 | 12.8 | 30.4 |
| Iron (mg/L) | | | | | |
| Commercial Polymer | 0.2 | 0.9 | — | 0.2 | — |
| Inventive Polymer | 0.2 | 2.4 | 6.3 | 2.3 | 0.8 |
| Zinc (mg/L) | | | | | |
| Commercial Polymer | 1.8 | 3.8 | — | 1.7 | — |
| Inventive Polymer | 2.1 | 8.4 | 17.7 | 6.6 | 2.7 |

In reviewing Tables 5–7, it is apparent that the inventive polymer resolubilized, or redispersed, and stabilized zinc from existing deposits in the system. This is evidenced in part by the high level of zinc analyzed in the deposit (Table 6) versus the <0.1 mg/L found in the make-up water (Table 5). While the level of zinc in the tower water prior to the addition of the water treatment composition was determined to be 0.79 mg/L, the amount of zinc stabilized by the inventive polymer was on the order of 2 to 17 mg/L (Table 7).

It is also apparent that the inventive polymer resolubilized, or redispersed, and stabilized iron from existing deposits in the system. As seen in Tables 5 and 6, the level of iron in the tower water was found to be 0.25 mg/L, compared to 0.06 mg/L in the make-up water. Additionally, the analysis of the deposit prior to polymer feed indicated high levels of iron. The amount of iron stabilized by the inventive polymer was found to be on the order of 0.2 to 6.3 mg/L (Table 7).

It is also apparent that the inventive polymer resolubilized, or redispersed, and stabilized phosphate from existing deposits in the system. As seen in Tables 5 and 6, the level of phosphate in the tower water was found to be about 2.8 mg/L, compared to less than 0.3 mg/L in the make-up water. Additionally, the analysis of the deposit prior to polymer feed indicated high levels of phosphate. The amount of phosphate stabilized by the inventive polymer was found to be on the order of 12.8 to 33.8 mg/L. In view of the fact that only 8 to 12 mg/L of phosphate were added to the system, the amount of phosphate stabilized is more than double of that added.

In view of the foregoing, it appears that the only explanation for the significantly higher levels of iron, zinc and phosphate stabilized by the inventive polymers is that the polymers have resolubilized, or redispersed, preexisting deposits in the system. These same effects are not indicated for the commercial water treatment polymer.

EXAMPLE 4

To determine hydrothermal stability of the inventive polymer relative to comparative polymers prepared from acrylic acid and 2-acrylamido-2-methyl propane sulfonic acid monomer, a series of aqueous solutions (pH 10±0.1) comprising 0.5% active polymer and 50 mg of sodium metabisulfite was prepared. Solutions containing an inventive polymer, comprising AA/MMA/ABS/SMA, and two comparative polymers; comprising AA/2-acrylamido-2-methyl propane sulfonic acid and AA/2-acrylamido-2-methyl propane sulfonic acid/nonionic monomer, respectively, were conditioned in a Parr®Bomb for 4 hours at 200 psi. The solutions were then tested for percent phosphate inhibition. A second set of solutions as above was also conditioned in a Parr®Bomb for 4 hours at 400 psi and subsequently tested for calcium phosphate inhibition.

The results indicate that after being exposed to such conditions, none of the solutions containing the comparative polymers exhibited acceptable phosphate inhibition performance, even at levels of use of 25 mg/L. Maximum percent phosphate inhibition for the comparative polymers was found to be about 10 weight percent at 17 to 25 mg/L treatment level. After conditioning for 4 hours at 200 psi, the solutions containing the inventive polymer exhibited phosphate inhibition of about 15% at 17 mg/L, about 20% at 19 mg/L, about 55% at 21 mg/L and about 95% at 25 mg/L. After being conditioned for 4 hours at 400 psi, the solutions containing the inventive polymer exhibited phosphate inhibition of about 10% at 17 mg/L, about 15% at 19 mg/L, about 25% at 21 mg/L and about 98% at 25 mg/L.

EXAMPLE 5

In order to determine the efficacy of the inventive polymers in stabilizing zinc in an aqueous system, test solutions were prepared comprising 5 mg/L zinc, 100 mg/L calcium, and 36 mg/L magnesium. To 50 ml of the solution was added a known level of the inventive polymer. To the solution was added 50 ml of a solution comprising 180 mg/L carbonate. The solution was placed in a water bath at 40° C. for 16 to 24 hours, after which time the sample was removed and allowed to cool to touch. The sample was filtered using a 0.2 micron filter paper and the filtrate analyzed for zinc using a Perkin-Elmer Flame Atomic Absorption Spectrophotomer. The above procedure was repeated utilizing the commercial AA/2-acrylamido-2-methyl propane sulfonic acid polymer. The results indicate that both the inventive and comparative polymers stabilized about 3 mg/L of the zinc at a pH of 8, about 0.75 to 1 mg/L at a pH of 9, and about 0.1 to 0.2 mg/L at a pH of 10. High zinc stabilization at the lower pH and low zinc stabilization at the higher pH insures that the zinc will be available as a corrosion inhibitor at higher pH.

EXAMPLE 6

To determine the performance of the polymer once formulated into a water treatment composition, an inventive polymer and the commercial AA/2-acrylamido-2-methyl propane sulfonic acid polymer both were formulated at levels of 10 weight percent and 15 weight percent into a water treatment composition comprising 3 weight percent (HEDP), 5 weight percent 3,000 $M_w$ polyacrylic acid, 5 weight percent molybdate, and 1 weight percent tolytriazole, at a pH of 12.5. The results indicate that at the 10 weight percent level, the water treatment composition containing the AA/2-acrylamido-2-methyl propane sulfonic acid polymer attained only about 35% phosphate inhibition at greater than 17 mg/L treatment level, while the composition containing the inventive polymer attained 90% phosphate inhibition at about 17 mg/L. The results indicate that at the 15 weight percent level, the water treatment composition containing the AA/2-acrylamido-2-methyl propane sulfonic acid polymer attained only about 70% phosphate inhibition at about 30 mg/L treatment level. The results indicate that, at least with respect to certain water treatment formulations, the AA/2-acrylamido-2-methyl propane sulfonic acid polymer exhibits a reduction in phosphate inhibition when so formulated, while the phosphate inhibition of the inventive polymer is stable when so formulated.

EXAMPLE 7

To determine the dispersancy of the inventive polymers, the following tests were performed.

1. An aqueous slurry of Betacote #2 clay was prepared at a solids level of 70 weight percent by mixing the clay and the water in a Waring blender for one minute. The viscosity of the blank, i.e., no polymer added, was measured using a Brookfield viscometer at 20 rpm, spindle #2. An AA/MMA/ABS/SMS inventive polymer was added to the slurry at levels of 0.5, 2.0, 2.5, and 3.0 lbs polymer/ton slurry, respectively, and the viscosity measured as above. The viscosity of the blank slurry was found to be 9850 cps, with the viscosities of the polymer treated slurries being 9750 cps, 5350 cps, 5500 cps and 6100 cps, respectively. As such, it is shown that the polymers are effective at reducing the viscosity of aqueous systems which contain particulate matter.

2. A 2 weight percent kaolin clay slurry in water was prepared. The slurry was stirred for at least 30 minutes, after which time 4 mg/L polymer (active) was added to the slurry. The sample was allowed to stir for at least 5 minutes after treatment. The sample then was transferred to an Imhoff cone. The sample was allowed to settle for 30 minutes, after which time the volume of sludge which had settled in the cone was measured and the turbidity of the supernatant was measured via a Hach DR/3000 spectrophotomer. The sludge accumulation of the blank slurry, i.e., no polymer added, was found to be 150 ml compared to 30 ml for the slurry which had been treated with the inventive polymer. The turbidity of the blank slurry was found to be 25 Nephelo Turbidity Units (NTU) compared to about 10,000 NTU for the slurry which had been treated with the inventive polymer. Both data points indicate that the inventive polymers exhibit adequate dispersancy.

EXAMPLE 8

To determine calcium carbonate inhibition relative to comparative AA/2-acrylamido-2-methyl propane sulfonic acid copolymers and AA/2-acrylamido-2-methyl propane sulfonic acid/nonionic terpolymer, the percent calcium carbonate inhibition was measure as a function of treatment level according to the following procedure.

Solution "A"

A calcium-containing brine solution was prepared using calcium chloride dihydrate, 12.15 g/L and sodium chloride, 33.00 g/L.

Solution "B"

A carbonate-containing brine solution was prepared using anhydrous sodium hydrogen carbonate, 7.36 g/L and sodium chloride, 33.00 g/L.

Antiscalant Preparation

The total solids or activity for antiscalant(s) to be evaluated was determined. The weight of antiscalant necessary to provide a 1.000 g/L (1000 mg/L) solids/active solution was determined using the following formula:

(% solids and/or activity)/100%="X"

"X"=decimal solids or decimal activity (1.000 g/L)/"X"=g/L antiscalant to yield a 1000 mg/L antiscalant solution

Indicator Solution

A murexide indicator solution, 0.15 g murexide/100 ml ethylene glycol was prepared.

EDTA Solution

A 0.01M EDTA solution, 3.722 g/L was prepared,

Sample Preparation

Solution "A" and Solution "B" were saturated with carbon dioxide immediately before using. Saturation was accomplished at room temperature by bubbling $CO_2$ through a fritted-glass dispersion tube immersed to the bottom of the container for at least 30 minutes. Using an electronic pipet, the correct amount of antiscalant polymer solution was added to a 4 oz. French Square Bottle to give the desired treatment level (i.e., 1000 ul of 1000 mg/L antiscalant solution=10 mg/L in samples). Fifty (50) ml of Solution "B" was dispensed into the bottle using Brinkman dispensette. Fifty (50) ml of Solution "A" was dispensed into the bottle using a Brinkman dispensette. Using a Brinkman dispensette, at least three blanks (samples containing no antiscalant treatment) were prepared by dispensing 50 ml of Solution "B" and 50 ml of Solution "A" to a 4 oz. French Square Bottle.

The bottles were immediately capped and agitated to mix thoroughly. The sample bottles were immersed to ¾ of their height in a water bath set at 71° C.±5° C. for 16 to 24 hours.

Sample Evaluation

All of the bottles were removed from the water bath and allowed to cool to the touch. A vacuum apparatus was assembled using a 250 ml side-arm Erlenmeyer flask, vacuum pump, moisture trap, and Gelman filter holder. The samples were filtered using 0.2 micron filter paper. The filtrate was transferred from the 250 ml side-arm Erlenmeyer flask into an unused 100 ml specimen cup. Using an electronic pipet, the filtrate was immediately acidified by adding 500 μl of concentrated nitric acid. The samples were titrated using the following method:

Samples and blanks:

Into a 250 ml Erlenmeyer flask, 10 ml of filtrate was dispensed using a Class "A" volumetric pipet. Fifty (50) ml of deionized water was added to the flask. Into the flask, 2 ml of 1.0N NaOH were dispensed using an electronic pipet. Five (5) to 20 drops of the murexide indicator solution were added, to the flask. Using a Class "A" buret and 0.01M EDTA solution, the sample was titrated to a purple-violet endpoint. Using a Class "A" volumetric pipet, 5 ml of solution "A" was dispensed into a 250 ml Erlenmeyer flask. Fifty (50) ml of deionized water was added to the flask. Into the flask, 2 ml of 1.0N NaOH was dispensed using an electronic pipet. Five (5) to 20 drops of the Murexide indicator solution were added, to the flask. Using a Class "A" Buret and 0.01M EDTA solution, the sample was titrated to a purple-violet endpoint.

Calculate The Percent Inhibition For All Samples

The percent inhibition for each treatment level was determined by using the following calculation:

$$\frac{S-B}{T-B} \times 100\% = \% \text{ INHIBITION}$$

TABLE 8

| Polymer | % Ca(CO$_3$) Inhibition at X mg/L Polymer Treatment Level | | | | |
|---|---|---|---|---|---|
| | 1 mg/L | 2 mg/L | 3 mg/L | 4 mg/L | 5 mg/L |
| AA/2A2MPS | 32 | 45 | 70 | 88 | 95 |
| AA/2A2MPS/ NONIONIC | 30 | 50 | 57 | 75 | 90 |
| AA/MMA/ABS/SBS | 8 | 42 | 60 | 65 | 63 |

EXAMPLE 9

To determine the stability of the polymers and nonionic surfactant in an aqueous composition, the following tests were performed.

Polymer E, a nonionic surfactant, and water were blended together at those polymer and nonionic surfactant active concentrations set forth in Table 9. Comparative aqueous blends of the same nonionic surfactant, water and either a 4,500 molecular weight poly(acrylic acid) or comparative Polymer C were blended. For surfactants which are liquid at ambient temperature, the polymer and surfactant mixed together easily. The mixture of water, polymer and nonionic surfactant then was divided into two portions. One portion was stored at 50° C. and the other portion was stored at 25° C. For surfactants which are solid at ambient temperature, the surfactant first must be heated above the melting point thereof, typically about 50° C. An aqueous solution of the polymer is heated to 50° C. and the melted nonionic surfactant then was added at the desired concentration. The mixture was shaken well and stored at 50° C. until such time as the mixture became clear, typically in less than one hour. The clear mixture then was divided into two portions. One portion was stored at 50° C. and the other portion was stored at 25° C. The inventive mixtures were compared to the respective comparative mixtures with respect to phase-stability in the absence of a solubilizing agent. Phase separation, as evidenced by the presence of two distinct phases, was determined for each mixture after one week storage at the respective temperatures. Results are set forth in Tables 9–12 below.

TABLE 9

| | Weight % | Polymer E | | Poly(acrylic acid)[2] | |
|---|---|---|---|---|---|
| Weight % active polymer | active sur- factant[1] | Number of Phases at 25 °C. | Number of Phases at 50° C. | Number of Phases at 25° C. | Number of Phases at 50° C. |
| 10 | 10 | 1 | 1 | 1 | 2 |
| 10 | 20 | 1 | 1 | 1 | 2 |
| 10 | 30 | 1 | 1 | 2 | 2 |
| 10 | 40 | 1 | 1 | 2 | 2 |
| 10 | 50 | 1 | 1 | 2 | 2 |
| 10 | 60 | 1 | 2 | 2 | 2 |
| 10 | 70 | 1 | 2 | 2 | 2 |
| 10 | 80 | 2 | 2 | 2 | 2 |
| 20 | 10 | 1 | 1 | 2 | 2 |
| 20 | 20 | 1 | 1 | 2 | 2 |
| 20 | 30 | 1 | 1 | 2 | 2 |
| 20 | 40 | 1 | 2 | 2 | 2 |
| 20 | 50 | 2 | 2 | 2 | 2 |
| 30 | 10 | 1 | 1 | 2 | 2 |

TABLE 9-continued

| Weight % active polymer | Weight % active surfactant[1] | Polymer E Number of Phases at 25 °C. | Polymer E Number of Phases at 50° C. | Poly(acrylic acid)[2] Number of Phases at 25° C. | Poly(acrylic acid)[2] Number of Phases at 50° C. |
|---|---|---|---|---|---|
| 30 | 20 | 1 | 1 | 2 | 2 |
| 30 | 30 | 1 | 1 | 2 | 2 |
| 30 | 40 | 2 | 2 | 2 | 2 |
| 40 | 10 | 1 | 1 | 2 | 2 |
| 40 | 20 | 2 | 2 | 2 | 2 |

TABLE 10

| Weight % active polymer | Weight % active surfactant[1] | Polymer E Number of Phases at 25° C. | Polymer E Number of Phases at 50° C. | Polymer C1 Number of Phases at 25° C. | Polymer C1 Number of Phases at 50° C. |
|---|---|---|---|---|---|
| 10 | 10 | 1 | 1 | 1 | 2 |
| 10 | 20 | 1 | 1 | 1 | 2 |
| 10 | 30 | 1 | 1 | 2 | 2 |
| 10 | 40 | 1 | 1 | 2 | 2 |
| 10 | 50 | 1 | 1 | 2 | 2 |
| 10 | 60 | 1 | 2 | 2 | 2 |
| 10 | 70 | 1 | 2 | 2 | 2 |
| 10 | 80 | 2 | 2 | 2 | 2 |
| 20 | 10 | 1 | 1 | 1 | 2 |
| 20 | 20 | 1 | 1 | 1 | 2 |
| 20 | 30 | 1 | 1 | 2 | 2 |
| 20 | 40 | 1 | 2 | 2 | 2 |
| 20 | 50 | 2 | 2 | 2 | 2 |
| 30 | 10 | 1 | 1 | 2 | 2 |
| 30 | 20 | 1 | 1 | 2 | 2 |
| 30 | 30 | 1 | 1 | 2 | 2 |
| 30 | 40 | 2 | 2 | 2 | 2 |
| 40 | 10 | 1 | 1 | 2 | 2 |
| 40 | 20 | 2 | 2 | 2 | 2 |

TABLE 11

| Weight % active polymer | Weight % active surfactant[1] | Polymer E Number of Phases at 25° C. | Polymer E Number of Phases at 50° C. | Poly(acrylic acid)[2] Number of Phases at 25° C. | Poly(acrylic acid)[2] Number of Phases at 50° C. |
|---|---|---|---|---|---|
| 10 | 10 | 1 | 1 | 1 | 1 |
| 10 | 20 | 1 | 1 | 1 | 1 |
| 10 | 30 | 1 | 1 | 2 | 2 |
| 10 | 40 | 1 | 1 | 2 | 2 |
| 10 | 50 | 2 | 2 | 2 | 2 |
| 20 | 10 | 1 | 1 | 2 | 2 |
| 20 | 20 | 1 | 1 | 2 | 2 |
| 20 | 30 | 1 | 2 | 2 | 2 |
| 20 | 40 | 1 | 2 | 2 | 2 |
| 20 | 50 | 2 | 2 | 2 | 2 |
| 30 | 10 | 1 | 1 | 2 | 2 |
| 30 | 20 | 1 | 1 | 2 | 2 |
| 30 | 30 | 1 | 1 | 2 | 2 |
| 30 | 40 | 2 | 2 | 2 | 2 |
| 40 | 10 | 2 | 2 | 2 | 2 |
| 40 | 20 | 2 | 2 | 2 | 2 |

TABLE 12

| Weight % active polymer | Weight % active surfactant[1] | Polymer E Number of Phases at 25° C. | Polymer E Number of Phases at 50° C. | Polymer C1 Number of Phases at 25° C. | Polymer C1 Number of Phases at 50° C. |
|---|---|---|---|---|---|
| 10 | 10 | 1 | 1 | 1 | 1 |
| 10 | 20 | 1 | 1 | 2 | 1 |
| 10 | 30 | 1 | 1 | 2 | 2 |
| 10 | 40 | 1 | 1 | 2 | 2 |
| 10 | 50 | 2 | 2 | 2 | 2 |
| 20 | 10 | 1 | 1 | 1 | 1 |
| 20 | 20 | 1 | 1 | 2 | 1 |
| 20 | 30 | 1 | 2 | 2 | 2 |
| 20 | 40 | 1 | 2 | 2 | 2 |
| 20 | 50 | 2 | 2 | 2 | 2 |
| 30 | 10 | 1 | 1 | 2 | 2 |
| 30 | 20 | 1 | 1 | 2 | 2 |
| 30 | 30 | 1 | 1 | 2 | 2 |
| 30 | 40 | 2 | 2 | 2 | 2 |
| 40 | 10 | 2 | 2 | 2 | 2 |
| 40 | 20 | 2 | 2 | 2 | 2 |

[1]$C_9$–$C_{11}$ alkoxylate (6 moles ethylene oxide); available from Shell Chemical under Neodol 91-6 tradename
[2]Molecular weight 4,500
[3]$C_{12}$–$C_{15}$ alkoxylate (9 moles ethylene oxide); available from Shell Chemical under Neodol 25-9 tradename As the data in Tables 9 and 11 indicate, the inventive polymers are more phase-stable in the presence of nonionic surfactants than are poly(acrylic acid), which is used conventionally in aqueous compositions such as liquid detergent compositions. Even more surprising is the fact that a copolymer of acrylic acid and 2A2MPS, a sulfonated acrylic copolymer, exhibited much worse stability in the presence of nonionic surfactant than did the polymers of the present invention. This is evidence that not just any sulfonated monomer may be used in preparing polymers which are stable to phase separation in aqueous compositions comprising the polymer and nonionic surfactant and which do not comprise a solubilizing agent. Rather, a great deal of experimentation was involved in determining that the selection of those particular types of sulfonated monomers which are claimed herein, in combination with the particular copolymerizable nonionic monomer and the particular copolymerizable olefinically unsaturated carboxylic acid monomer, at the particular respective molar ratios as claimed herein, was critical in providing a multifunctional polymer which exhibits all of the properties of the polymers according to the present invention, in the various end-uses thereof.

We claim:

1. A composition, comprising:
    (a) from about 10 to about 40 weight percent of a polymer which comprises the polymerization product of,
        at least 2.5 mole percent of an allyloxybenzenesulfonic acid monomer represented by the chemical structure (I):

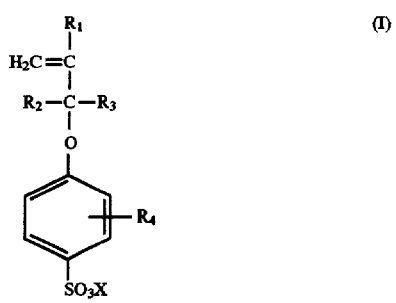

(I)

wherein $R_1$, $R_2$, $R_3$, and $R_4$ are independently hydrogen or $C_1$–$C_6$ alkyl; and X is hydrogen, an alkali or alkaline earth metal or ammonium, at least 0.5 mole percent of a methallylsulfonic acid monomer, from 10 to 20 mole percent of a copolymerizable nonionic monomer represented by the chemical structure (III):

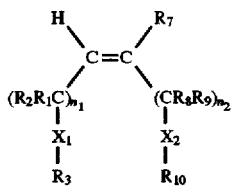

wherein $n_1$ and $n_2$ are independently 0 to 10; $R_1$, $R_2$, $R_8$ and $R_9$ are independently hydrogen, $C_1$–$C_6$ alkyl, or $C_1$–$C_6$ alkyl-substituted aryl; $R_7$ is hydrogen, $C_1$–$C_6$ alkyl, or $CO_2X$, where X is hydrogen, an alkali or alkaline earth metal or $C_1$–$C_{alkyl}$; $x_1$ and $X_2$ are absent or are independently O, C=O, or hydrogen; $R_3$ is absent or is C=$O_4$, $OR_4$, $NR_5R_6$, $C_1$–$C_{18}$ alkyl or hydrogen, where $R_4$ is $C_1$–$C_{18}$ alkyl or hydrogen and $R_5$ and $R_6$ are independently hydrogen, $C_1$–$C_6$ alkyl, or an alkyloxyether or alcohol; and $R_{10}$ is absent or is C=$OR_{11}$, $OR_{11}$, $NR_{12}R_{13}$, $C_1$–$C_{18}$ alkyl, or hydrogen, where $R_{11}$ is $C_1$–$C_{18}$ alkyl or hydrogen, $R_2$ and $R_3$ are independently hydrogen, $C_1$ to $C_6$ alkyl, or an alkyloxyether or alcohol; and at least 60 mole percent of a copolymerizable olefinically unsaturated carboxylic acid monomer (b) from about 10 to about 70 weight percent of a nonionic surfactant; and (c) water, wherein the composition is stable to phase separation in the substantial absence of a solubilizing agent.

2. The composition of claim 1 wherein the polymer comprises the polymerization product of from 2.5 to 10 mole percent of the allyloxybenzenesulfonic acid monomer, from 0.5 to 10 mole percent of the methallylsulfonic acid monomer, from 10 to 20 mole percent of the copolymerizable nonionic monomer; and from 60 to 87 mole percent of the copolymerizable olefinically unsaturated carboxylic acid monomer.

3. The composition of claim 2 wherein the allyloxybenzenesulfonic acid monomer is represented by the chemical structure (II):

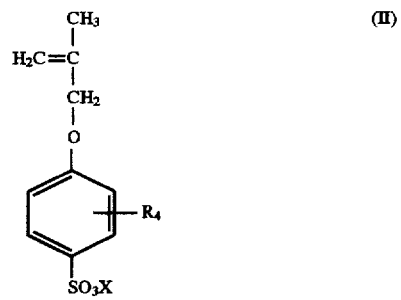

wherein $R_4$ is hydrogen or $C_1$–$C_6$ alkyl, X is hydrogen an alkali or alkaline earth metal or ammonium, the methallylsulfonic acid monomer is selected from the group consisting of methallylsulfonic acid and the alkali or alkaline earth metal or ammonium salts thereof, the copolymerizable nonionic monomer is selected from the group consisting of $C_1$–$C_6$ alkyl esters of (meth)acrylic acid, $C_1$–$C_6$ alkyl esters of unsaturated $C_1$–$C_5$ vinylic acids, and $C_1$–$C_6$ alkyl esters of saturated $C_1$–$C_5$ aliphatic monocarboxylic acids; and the copolymerizable olefinically unsaturated carboxylic monomer is selected from the group consisting of acrylic acid, methacrylic acid, ethacrylic acid, alpha-chloro-acrylic acid, alpha-cyano acrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, maleic anhydride, citraconic acid, mesaconic acid, glutaconic acid, aconitic acid, fumaric acid, and tricarboxy ethylene.

4. The composition of claim 3 wherein the allyloxybenzenesulfonic acid monomer is p-allyloxybenzene sulfonic acid, the methallyl sulfonic acid monomer is sodium methallyl sulfonate, the copolymerizable nonionic monomer is selected from the group consisting of methyl (meth)acrylate, mono- and dimethyl maleate, mono- and di-ethyl itaconate, (meth)allyl acetate, (meth)allyl propionate and (meth)allyl valerate; and the copolymerizable olefinically unsaturated carboxylic acid monomer is selected from the group consisting of (meth)acrylic acid, maleic acid, maleic anhydride and itaconic acid.

5. The composition of claim 1 wherein the nonionic surfactant is selected from the group consisting of alkoxylated alcohols, alkoxylated amines, alkoxylated nonylphenol, alkylaryl alkoxylates and zwitterionic surfactants.

6. The composition of claim 1 further comprising an anionic surfactant.

7. The composition of claim 1 further comprising from about 2 weight percent to about 55 weight percent of a builder.

* * * * *